No. 832,952. PATENTED OCT. 9, 1906.
R. G. BROOKE.
INJECTOR.
APPLICATION FILED JAN. 2, 1906.

PATENTED OCT. 9, 1906.

R. G. BROOKE.
INJECTOR.
APPLICATION FILED JAN. 2, 1906.

Witnesses
W. Henry Simms
E. Clough

Inventor
R. G. Brooke
Attorney

No. 832,952. PATENTED OCT. 9, 1906.
R. G. BROOKE.
INJECTOR.
APPLICATION FILED JAN. 2, 1906.

No. 832,952. PATENTED OCT. 9, 1906.
R. G. BROOKE.
INJECTOR.
APPLICATION FILED JAN. 2, 1906.

Witnesses.
W. Henry Simms
E. Clough.

Inventor:
R. G. Brooke
[signature]
Attorney

No. 832,952. PATENTED OCT. 9, 1906.
R. G. BROOKE.
INJECTOR.
APPLICATION FILED JAN. 2, 1906.

Witnesses.
W Henry Simms
E. Clough.

Inventor.
R. G. Brooke

Attorney

UNITED STATES PATENT OFFICE.

ROBERT GRUNDY BROOKE, OF MACCLESFIELD, ENGLAND.

INJECTOR.

No. 832,952.      Specification of Letters Patent.      Patented Oct. 9, 1906.

Application filed January 2, 1906. Serial No. 294,274.

*To all whom it may concern:*

Be it known that I, ROBERT GRUNDY BROOKE, a subject of the King of Great Britain and Ireland, residing at Macclesfield, in the county of Chester, England, have invented Improvements in Steam and Water Injectors, of which the following is a specification.

Injectors have heretofore been constructed in which the supply of water to the injector is controlled by the same movement as that used to control the supply of steam to the injector; but the constructions heretofore adopted for this purpose possess various practical disadvantages.

Now the present invention has for its object to improve the construction and working of such injectors. For this purpose according thereto the steam and water controlling valves are so constructed and arranged in relation to each other and to the actuating means (hereinafter called for distinction the "starting-handle") used for starting and stopping the injector that while both valves can be caused to open by moving the handle in the direction to start the injector and both valves can be caused to close by moving the handle to its full extent in the opposite direction to stop the injector, as heretofore, the steam-valve and the water-valve are capable of respectively regulating the supply of steam and water in such a manner that after the valves have been opened to admit steam and water to the injector and the water has been fully opened, the steam-valve can, when required, be gradually opened to a further extent to supply a larger quantity of steam, for example, at a lower pressure and the water-valve be automatically and simultaneously closed more or less, so as suitably to reduce the supply of water, and the former valve can afterward, when required, be partially closed to reduce the supply of steam, for example, at a higher pressure, and the water-valve be automatically and simultaneously opened to a further extent, so as suitably to increase the supply of water. In this way the quantity of water supplied to the injector can be varied inversely to that of the steam during the working of the injector to suit various working conditions, such as the pressure of the steam-supply, the height of lift, the head of the water-supply, the temperature of the water, &c.

The water-valve, which is made separate from the steam-valve, as heretofore, may be operated from the spindle of the latter valve or from the operating-handle through suitable means—as, for example, a screw or a lever. The steam-valve and its seat may be variously constructed and arranged to allow the supply of steam to be regulated to suit different requirements. The steam and water valves can be of various types and may be arranged to open simultaneously, or practically so, and to close simultaneously, or practically so. They are, however, preferably arranged to open one before the other and to close one before the other, so as to obviate any necessity of attempting to time them to become seated at the same moment, which in practice is difficult to effect in a satisfactory manner in cases where the valves are arranged to bear endwise against their seats when closed, as is preferred.

As will be obvious, steam and water valves and actuating or controlling mechanism therefor to operate in the manner set forth can be constructed in various forms and be used in connection with injectors which in other respects may be of various constructions.

According to one construction the water-supply is regulated by a compound valve so constructed and arranged that after being moved in one direction to open the water-inlet fully it will by continued movement in the same direction partly close the said inlet and upon being afterward moved in the reverse direction it will first increase the size of the water-inlet and by continued movement in the same direction finally close the water-inlet.

In the accompanying illustrative drawings.

Figure 1:
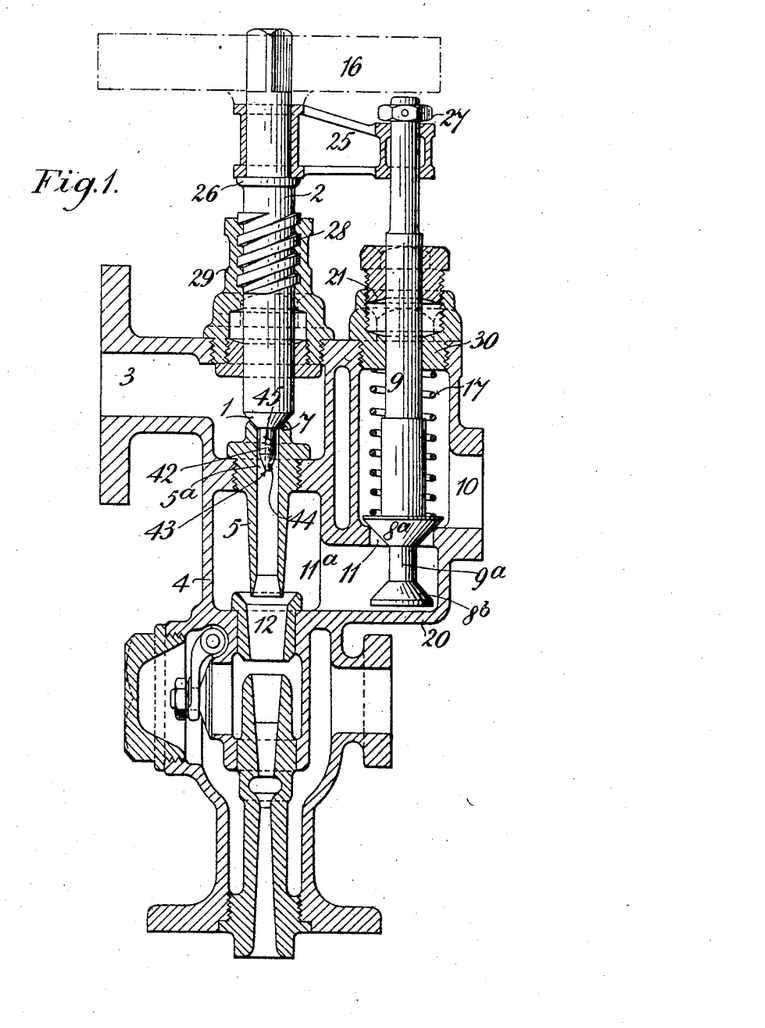
Figures 1, 2, and 3 represent an example of an injector according to the construction just referred to, Fig. 1 being a vertical section of the injector with the steam and water valves closed, Fig. 2 being a diagrammatic view of the injector with the steam-valve partly open and the water-valve fully open, and Fig. 3 being a view similar to Fig. 2, but showing the steam-valve fully open and the water-valve partly open.
Figure 2:
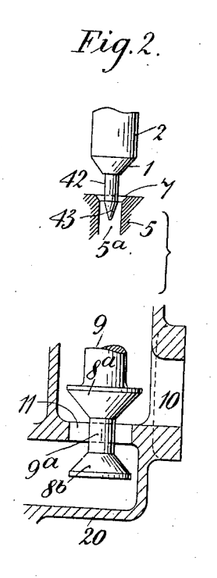
Figure 3:
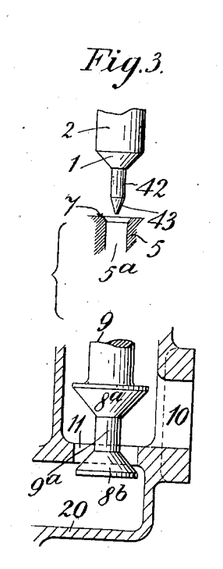

In the injector shown in Figs. 1, 2, and 3 the steam and water valve spindles 2 and 9, respectively, are movable endwise and arranged parallel to one another. They are connected by an arm or yoke piece 25, through which the spindles freely extend and which is carried at one end by a collar 26 on the steam-valve spindle 2 and is adapted at the other end to act against a collar or abutment 27 (a nut is shown) on the water-valve spindle 9, the steam-valve spindle being screw-threaded at 28 and engaging a correspondingly screw-threaded stationary part 29 of the injector-casing 4. The starting-handle 16 is fixed to the spindle 2. For regulating the steam-supply the inner end portion of the steam-spindle 2 is provided with or shaped to form a steam-valve 1, that is adapted to fit against a seat 7 on the steam-nozzle 5. In cases where it is desired to obtain a closer regulation of the steam than can be obtained with a plain steam-valve, such as 1, such a valve may, as in the example now being described, be provided with an extension or regulator of known construction comprising a cylindrical portion 42, that extends centrally through and is made of smaller diameter than the contracted part 5$^a$ of the steam-nozzle 5, and a conical free end portion 43 to adapt it to serve as a steam-regulator, the arrangement being such that when the spindle 2 is moved in a direction to open the main valve 1 and admit steam to the steam-cone 5 the cylindrical portion 42 of the extension will project through the contracted part 5$^a$ of the steam-nozzle 5 for some time after the valve 1 has commenced to open, so as to form an annular steam-inlet of one area, and then the supply of steam can be gradually increased by causing the conical free end portion 43 of the extension or regulator gradually to leave the contracted part 5$^a$ of the nozzle and increase the steam-inlet area, while the supply of steam can be reduced by moving the spindle and regulator in the opposite direction. In this way a more delicate regulation of the steam-supply can be obtained to suit different steam-pressures than can be obtained by a single conical steam-valve. The extension or regulator 42 43 may be formed, as heretofore, with a centrally-arranged hole 44 with lateral branches 45 to improve the vacuum at starting. For regulating the water-supply a compound water-valve is used, comprising two oppositely and reversely arranged truncated cones 8$^a$ 8$^b$, (hereinafter called, for distinction, "main" and "supplementary" cones,) arranged at a suitable distance apart upon the spindle 9 and at opposite sides of a water-inlet opening 11, through which the part of the spindle 9$^a$ between the two cones 8$^a$ and 8$^b$ works, the opening 11 connecting two waterways in the valve-case, of which one waterway—viz., 10—communicates with a water-supply pipe and the other communicates with a port 11$^a$, opening into the interior of the injector. Located within the water-valve case 20 and surrounding the valve-spindle 9, extending therethrough, is a coiled spring 17, of which one end bears against a cover 30, screwed into the valve-case 20, and the other end bears against the main cone 8$^a$ and tends to cause it to keep closed or to close the water-inlet opening 11.

The arrangement is such that if the starting-handle 16 be turned in a direction to open the steam-valve 1 and start the injector the arm or yoke piece 25 will shortly bear against the abutment 27 and commence to move the water-valve spindle 9 outward against the action of the spring 17, and so cause the main cone 8$^a$ to open the water-inlet passage 11, the steam entering the nozzle 5 through the annular space between the nozzle and the cylindrical portion 42 of the extension or regulator (if such be employed) until the end of the cylindrical portion 42 comes level with the outer end of the contracted portion 5$^a$ of the nozzle 5 when the water-valve 8$^a$ 8$^b$ will have been moved into the fully-open position. (Shown in Fig. 2.) By continuing the movement of the starting-handle so as to cause the conical end 43 of the steam-valve regulator gradually to leave the contracted end 5$^a$ of the nozzle and increase the supply of steam, Fig. 3—as, for instance, when using low-pressure steam—the supplementary cone 8$^b$ will be caused to close the water-inlet opening 11 partly and suitably reduce the supply of water, and upon afterward moving the starting-handle in the reverse direction so as to cause the conical end of the regulator to reënter the nozzle and reduce the supply of steam—as, for instance, when using high-pressure steam—the compound valve 8$^a$ 8$^b$ under the action of its spring 17 will be caused simultaneously to move in the opposite direction, the supplementary cone 8$^b$ then moving away from the water-inlet opening 11, so as to increase suitably the supply of water. On completing the movement of the handle in the last-mentioned direction the main cone 8$^a$ will be caused by its spring 17 to close the said water-inlet opening and shut off the supply of water, and the steam-valve 1 will be caused to cut off the supply of steam, the parts then resuming the position shown in Fig. 1.

Figure 4:
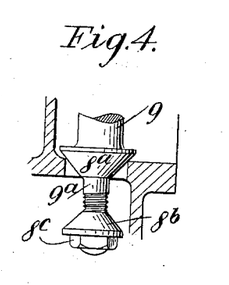
Fig. 4 is a sectional view representing a modification.

In Figs. 1, 2, and 3 the main and supplementary cones $8^a$ and $8^b$ are formed in one piece with the spindle 9 $9^a$; but the main cone $8^a$ may, as shown in Fig. 4, be formed in one piece with or be fixed to the valve-spindle 9 and the supplementary cone $8^b$ be screwed on the extension $9^a$ of the spindle 9, so as to be adjustable thereon and be formed to a suitable angle to meet circumstances.

$8^c$ is a lock-nut.

It is to be clearly understood that the use of an extension or regulator 42 43 is not an essential feature of an injector constructed according to this invention. When the regulator 42 43 is not used, the water-passage 11 may be increased in size and the main and supplementary water-valve cones $8^a$ and $8^b$ be arranged closer together, so that the cone $8^b$ will come into action earlier—that is to say, in some cases before the steam-valve is withdrawn from the steam-nozzle far enough to lose its regulating effect altogether—or the angles of the valves $8^a$ and $8^b$ might be suitably varied.

When the water-valve is opened from the spindle 2 of the steam-valve 1 and closed by a spring 17, as described, the water-valve can be caused to come to rest in a position to shut off the water-supply before the steam-valve need have come to rest in its position of closure, thereby obviating any difficulty in insuring the complete closing of the two valves or any necessity for timing the valves to close against their seats simultaneously, which is difficult to effect in practice. This is an important feature in the construction of injectors having separate steam and water valves and may be used in injectors in which not only are the steam and water valves arranged with their axes parallel to one another, but also in cases where they are arranged with their axes at right or other angles to each other.

Figures 5, 6:
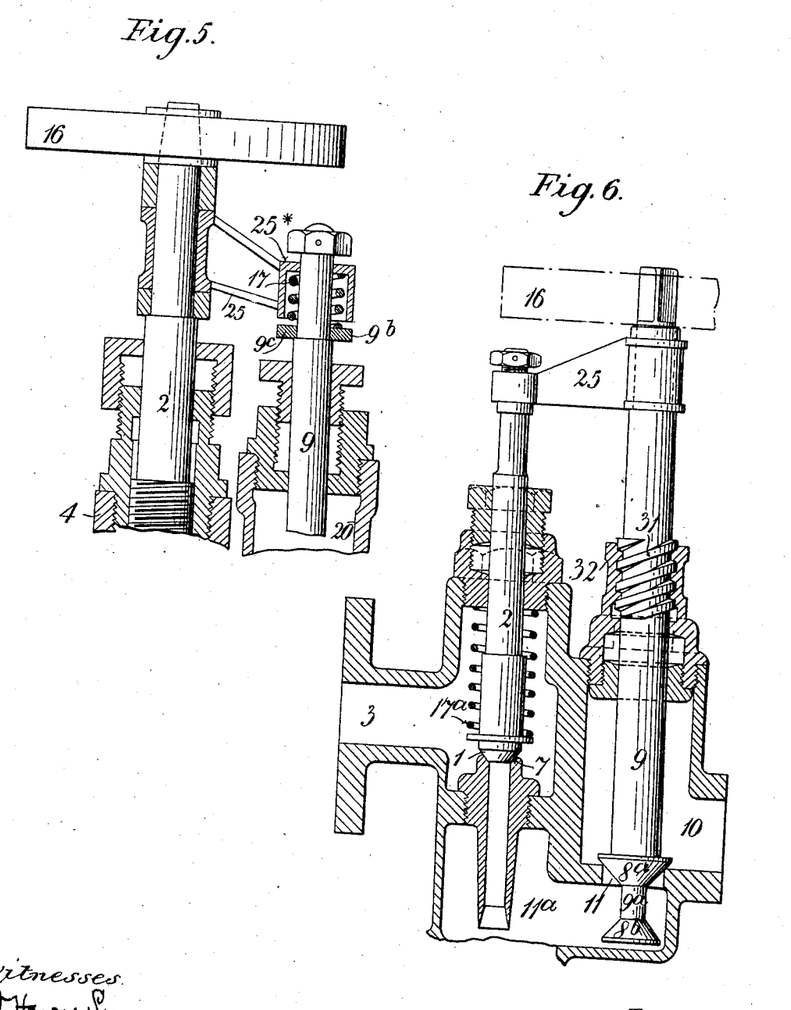
Fig. 5 is a sectional view of a further modification.
Fig. 6 is a partial section of an injector differing from that shown in Figs. 1, 2, and 3 in that the water-valve is opened and closed positively and the steam-valve is opened positively, but closed by a spring.

The spring 17 for moving the water-valve into the closed position may, as shown in Fig. 5, be arranged outside the valve-case 20 and between the recessed end $25^\times$ of the arm 25 and a washer $9^b$, bearing against a shoulder $9^c$ on the valve-spindle 9. In this case the arm 25 is held firmly in place endwise on the spindle 2, which, however, is free to turn therein.

Fig. 6 shows in vertical section a portion of the injector wherein the spindles 2 and 9 of the regulating steam and water valves 1 and $8^a$ $8^b$ are arranged parallel to one another and connected by an arm or yoke piece 25, as before; but the steam-valve 1 is arranged to be opened by movement of the spindle 9 of the water-valve $8^a$ $8^b$ and to be closed by a spring $17^a$, and the starting-handle 16 is fixed to the water-valve spindle 9, which is screw-threaded at 31 and arranged to engage a correspondingly screw-threaded stationary part 32 of the injector-casing. In this case the steam-valve 1 is shown without an additional extension or regulator.

Figure 7:
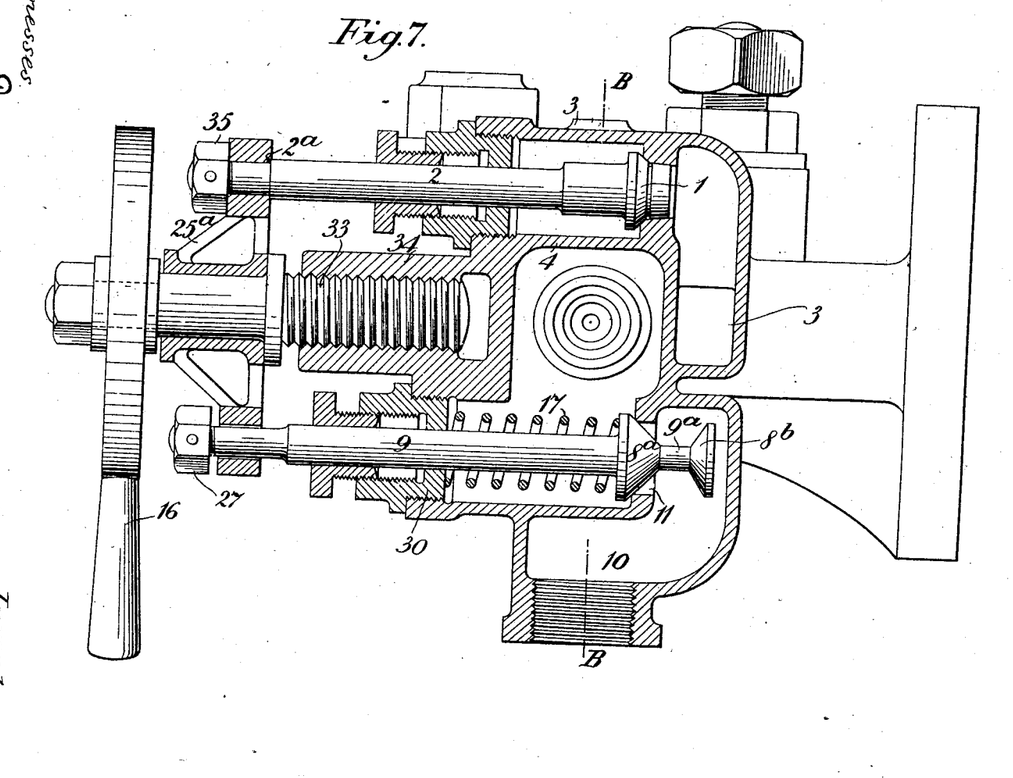
Figs. 7 and 8 are sectional views taken at right angles to each other of an injector wherein the valves are operated by means of a screw distinct from the valve-spindles.
Figure 8:
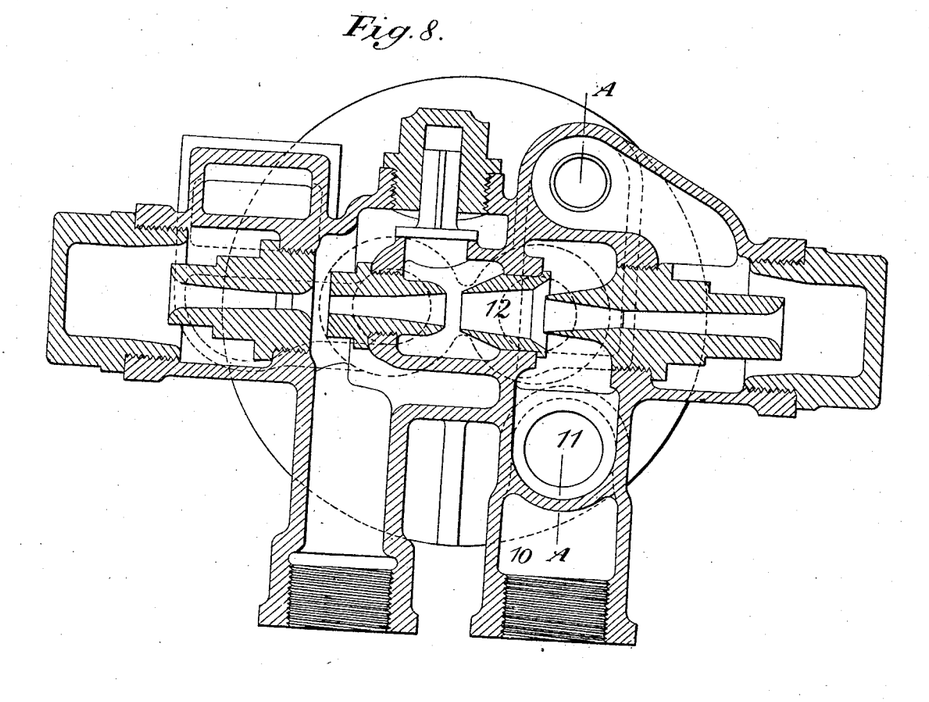

In the injector, of which Fig. 7 is a section corresponding to the line A A of Fig. 8 and Fig. 8 is a section corresponding to the line B B of Fig. 7, the spindle 2 of the steam-valve 1 and the spindle 9 of the compound water-valve $8^a$ $8^b$ are connected to a yoke-piece $25^a$, to which is secured a rotary screw 33, which engages a correspondingly screw-threaded part 34, carried by the body 4 of the injector and to which the starting-handle 16 is fixed. In this case the regulating steam and water valves 1 and $8^a$ $8^b$ might be both connected to the yoke-piece $25^a$, so as to be moved in one direction only thereby against the action of one or more springs that cause them to move in the reverse direction when the starting-handle is turned in the opposite direction. In the example only one spring 17, which surrounds the spindle 9 and acts against the water-valve $8^a$ $8^b$, is used, the yoke-piece $25^a$ being secured to the steam-valve spindle 2 between a shoulder $2^a$ thereon and a nut 35; but both the steam-valve and the water-valve might be arranged to be opened in a positive manner against the action of springs that serve to close them independently of each other.

Figure 9:
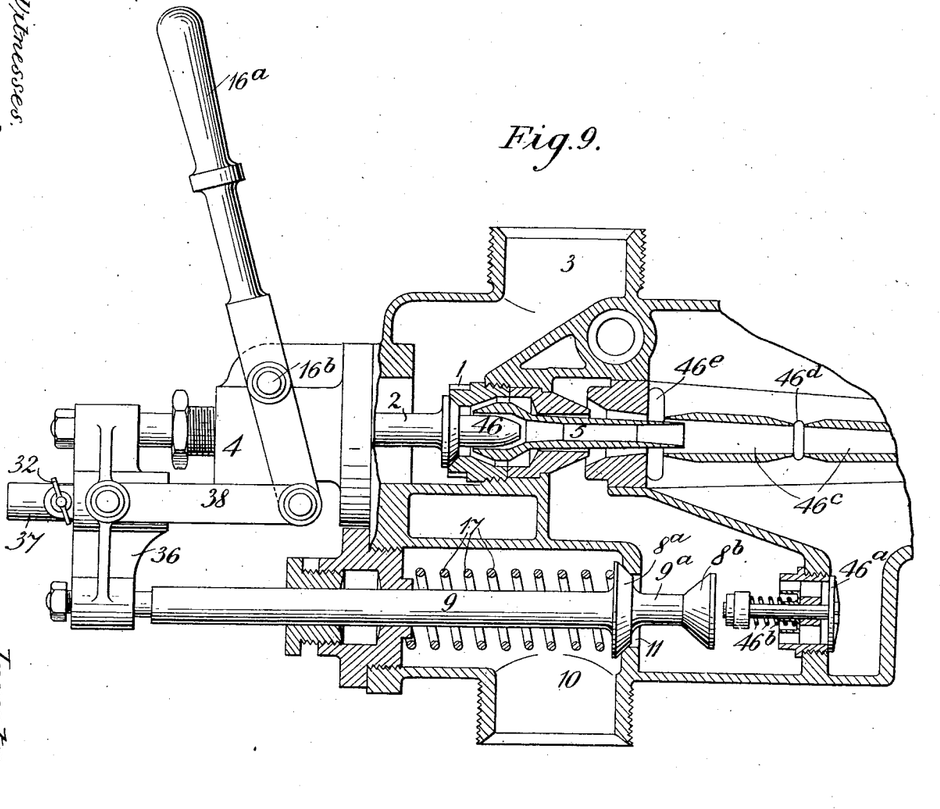
Figs. 9 and 10 are partial sectional views of two injectors wherein levers are employed for operating the valve-spindles.

The steam-valve and the compound water-valve may be connected through their spindles in various ways to an operating-lever, which is common to them, and whereby they can be directly moved in either direction, as required. Fig. 9 shows, by way of example, an injector wherein the steam-valve spindle 2 and the water-valve spindle 9 are connected to a common yoke-piece 36, that is mounted to slide on a fixed guide-pin 37 and is connected through a pair of links 38 to the forked end of a hand-lever $16^a$, which is pivoted at an intermediate part of its length—viz., at $16^b$—to the injector-casing 4, the arrangement being such that by turning the hand-lever in one or other direction about its pivot the valve-spindles can be caused to move endwise in one or other direction to turn on, to regulate, or to cut off the supply of steam and water, as hereinbefore described. The yoke-piece 36 is shown provided with a set-screw 39, whereby it and the attached parts can be fixed in any position into which they are moved. In this example means of known kind are provided for the further regulation of the steam, the steam-valve spindle 2 being provided with an extension 46, adapted practically to fit the correspondingly-shaped end of the steam-nozzle 5 when the valve 1 is closed, so that the area of the steam-inlet will begin to increase gradually when the valve commences its opening movement. The injector is also provided in a known manner with a suction-valve 46ª, loaded with a light spring 46ᵇ, but adapted to enable the vacuum in the combining-nozzle 46ᶜ under certain working conditions to draw in as required an additional supply through openings 46ᵈ, located in the combining-nozzle and supplementary to its main water-inlet 46ᵉ.

Figure 10:
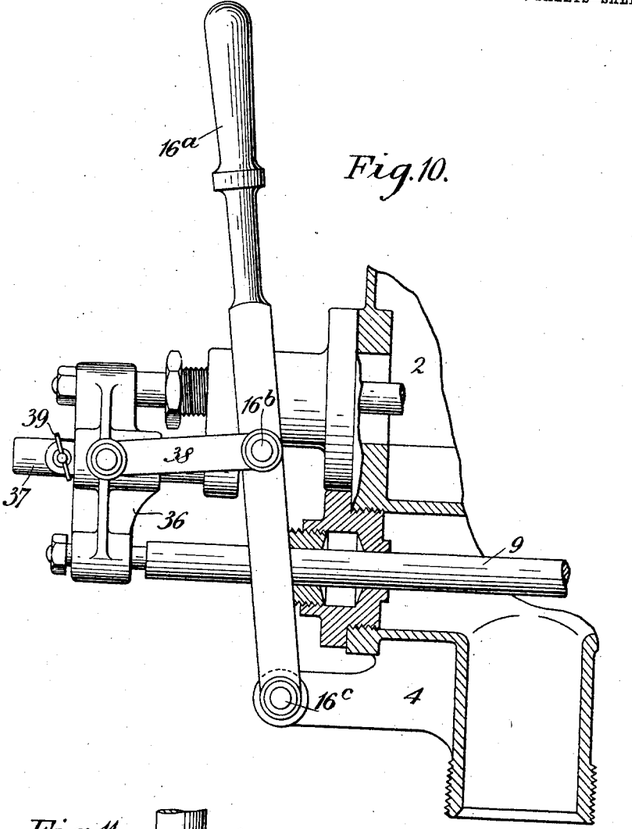

Fig. 10 shows an injector of slightly-modified construction wherein the forked end of the hand-lever 16ª is pivoted at one end—viz., at 16ᶜ—to the injector-casing 4 and the links 38 are connected to it at a part between its ends, so that the steam-valve can be opened by pulling the lever to the left instead of pulling it to the right, as is done with the arrangement shown in Fig. 9.

Figure 11:
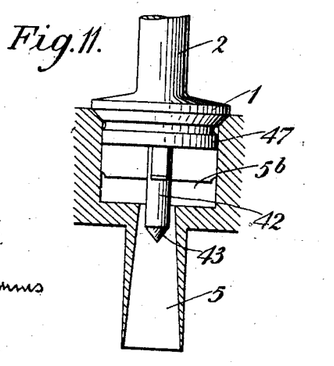
Fig. 11 shows a steam-valve adapted to prevent steam from entering the steam-nozzle until after the openings of the water-valve.

For causing the steam to be turned on after the water the steam-valve 1 may, as shown in Fig. 11, be provided at its discharge side with a cylindrical extension 47, arranged to work in a correspondingly-formed recess 5ᵇ in the inlet end of the steam-nozzle 5, so that on opening the steam-valve steam will not be admitted to the steam-nozzle until the cylindrical extension 47 leaves the recess 5ᵇ, as it will after the water-valve has been opened. The extension or regulator 42 43 when used with such a valve is arranged at the inner side of the extension 47, as shown.

The overflow-valves of injectors embodying the present invention may also, if desired, be arranged to be operated from the starting-handle or equivalent part, as in known constructions of injectors.

Various changes can be made in construction without departing from the essential features of the invention.

What I claim is—

1. An injector comprising a steam-controlling valve, a water-controlling valve, and an actuating device adapted by movement in one direction to cause the opening of both of said valves and by movement in the opposite direction to cause the closing of both of said valves, said valves being so constructed and related to said actuating device that after said water-controlling valve has been opened to its full extent by movement of said actuating device continued movement of said actuating device in the same direction will reduce the opening of said water-controlling valve and will simultaneously increase the opening of said steam-controlling valve.

2. An injector comprising a steam-controlling valve, a water-controlling valve, an actuating device adapted by movement in one direction to cause the opening of both of said valves and by movement in the opposite direction to cause the closing of both of said valves, and for one of said valves elastic means adapted to close it or keep it closed when not prevented by said actuating device, said valves being so constructed and related to said actuating device that after said water-controlling valve has been opened to its full extent by movement of said actuating device continued movement of said actuating device in the same direction will reduce the opening of said water-controlling valve and will simultaneously increase the opening of said steam-controlling valve.

3. An injector comprising a steam-controlling valve, a water-controlling valve, an actuating device adapted by movement in one direction to cause the opening of both of said valves and by movement in the opposite direction to cause the closing of both of said valves, and for said water-controlling valve elastic means adapted to close it or keep it closed when not prevented by said actuating device, said valves being so constructed and related to said actuating device that after said water-controlling valve has been opened to its full extent by movement of said actuating device continued movement of said actuating device in the same direction will reduce the opening of said water-controlling valve and will simultaneously increase the opening of said steam-controlling valve.

4. An injector comprising a steam-controlling valve, a water-controlling valve, and an actuating device adapted by movement in one direction to cause the opening of both of said valves and by movement in the opposite direction to cause the closing of both of said valves, said valves being so constructed and related to said actuating device that after said water-controlling valve has been opened to its full extent by movement of said actuating device continued movement of said actuating device in the same direction will reduce the opening of said water-controlling valve and will simultaneously increase the opening of said steam-controlling valve, and said water-controlling valve being a compound valve adapted after being moved in one direction so as to open to its full extent to have its opening reduced by its continued movement in the same direction.

5. An injector comprising a steam-controlling valve, a water-controlling valve, and an actuating device adapted by movement in one direction to cause the opening of both of said valves and by movement in the opposite direction to cause the closing of both of said valves, said valves being so constructed and related to said actuating device that after said water-controlling valve has been opened to its full extent by movement of said actuating device continued movement of said actuating device in the same direction will reduce the opening of said water-controlling valve and will simultaneously increase the opening of said steam-controlling valve, and said water-controlling valve being a compound valve comprising two parts which are arranged on opposite sides of the water-aperture intended to be opened and closed thereby and both of which are adapted to control the passage of water through said aperture so that said water-controlling valve is adapted to be by movement in one direction first opened to its full extent by the motion of one of its said parts away from said aperture and afterward to have the extent of its opening reduced by movement of the other of its said parts toward said aperture.

6. An injector comprising separate steam and water controlling valves, separate spindles carrying such valves, an actuating device common to said spindles, one of said spindles being adapted to allow said device after causing the closure of the corresponding valve to continue its movement in the same direction, and elastic means adapted to close the last-mentioned valve and to keep it closed when not prevented by said actuating device.

7. An injector comprising a steam-controlling valve, a water-controlling valve, separate spindles carrying said valves, an actuating device common to said spindles, said spindles carrying said water-controlling valve being adapted to allow said device after causing the closure of said water-controlling valve to continue its movement in the same direction, and elastic means adapted to close said water-controlling valve or keep it closed when not prevented by said actuating device.

8. An injector comprising a steam-controlling valve, a water-controlling valve, parallel spindles carrying said valves, a yoke-piece operatively connected to both of said spindles, one of said spindles being adapted to allow said device after causing the closure of said water-controlling valve to continue its movement in the same direction, and elastic means adapted to close the last-mentioned valve or keep it closed when not prevented by said yoke-piece.

9. An injector comprising a steam-controlling valve, a water-controlling valve, parallel spindles carrying said valves, a yoke-piece operatively connected to both of said spindles, said spindle carrying said water-controlling valve being adapted to allow said yoke-piece after causing the closure of said water-controlling valve to continue its movement in the same direction, and elastic means adapted to close said water-controlling valve or keep it closed when not prevented by said yoke-piece.

10. An injector comprising a steam-controlling valve, a water-controlling valve, parallel spindles carrying said valves, a yoke-piece operatively connected to both of said spindles, one of said spindles being adapted to allow said yoke-piece after causing the closure of the corresponding valve to continue its movement in the same direction, and elastic means adapted to close the last-mentioned valve or keep it closed when not prevented by said yoke-piece, and an actuating device adapted to operate said yoke-piece and by movement in one direction to open both of said valves and by movement in the opposite direction to close both of said valves, said valves being so constructed and related to said actuating device that after said water-controlling valve has been opened to its full extent by movement of said actuating device continued movement of said actuating device in the same direction will reduce the opening of said water-controlling valve and will simultaneously increase the opening of said steam-controlling valve.

11. An injector comprising separate steam and water controlling valves, separate spindles carrying said valves, an actuating device common to said spindles and adapted thereby to cause the opening and closing of said valves, one of said spindles being adapted to allow said actuating device after causing the closure of the corresponding valve to continue its movement in the same direction, and elastic means adapted to close the last-mentioned valve or keep it closed when not prevented by said actuating device.

12. An injector comprising separate steam and water controlling valves, separate spindles carrying said valves, an actuating device common to said spindles and adapted thereby to cause the opening and closing of said valves, one of said spindles being adapted to allow said actuating device after causing the closure of the corresponding valve to continue its movement in the same direction, and elastic means adapted to close the last-mentioned valve or keep it closed when not prevented by said actuating device, said valves being so constructed and related to said actuating device that after said water-controlling valve has been opened to its full extent by movement of said actuating device continued movement of said actuating device in the same direction will reduce the opening of said water-controlling valve and will simultaneously increase the opening of said steam-controlling valve.

Signed at Manchester, county of Lancaster, England, this 20th day of December, 1905.

ROBERT GRUNDY BROOKE.

Witnesses:
　ERNALD SIMPSON MOSELEY,
　MALCOLM SMETHURST.